(12) United States Patent
Kuo et al.

(10) Patent No.: US 7,721,965 B2
(45) Date of Patent: May 25, 2010

(54) COMPUTERIZED ELECTRONIC DEVICE WITH BILL VALIDATING MODULE

(75) Inventors: Szu-Wei Kuo, Tu-Cheng (TW); Wen-Chu Wang, Tu-Cheng (TW); Juan Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 836 days.

(21) Appl. No.: 11/309,549

(22) Filed: Aug. 18, 2006

(65) Prior Publication Data

US 2007/0171672 A1    Jul. 26, 2007

(30) Foreign Application Priority Data

Jan. 11, 2006    (CN) .................... 2006 2 0053814. 2

(51) Int. Cl.
*G06K 7/10* (2006.01)

(52) U.S. Cl. .................... 235/454; 235/462.01; 235/379

(58) Field of Classification Search ................. 235/454, 235/462.01, 462.13, 375, 385, 379
See application file for complete search history.

(56) References Cited

U.S. PATENT DOCUMENTS

| 5,135,212 | A | 8/1992 | Utsumi |
| 5,739,509 | A | 4/1998 | Watanabe |
| 5,974,883 | A | 11/1999 | Ross |
| 6,918,482 | B2 | 7/2005 | Thierauf |
| 2004/0079906 | A1* | 4/2004 | Balog et al. ................. 250/556 |

* cited by examiner

*Primary Examiner*—Karl D. Frech
(74) *Attorney, Agent, or Firm*—Wei Te Chung

(57) ABSTRACT

A computerized electronic device includes a base, a display pivoted to the base, a sending module fixed to the display for emitting a light beam, a receiving module fixed to the base for receiving the light beam emitted by the sending module passing through a bill to be detected, and a controller for receiving signals from the receiving module and processing the signals to obtain a result therefrom. The computerized electronic device adopts computer-aided devices to complement bill validation. This greatly improves the accuracy and smartness of bill validation.

11 Claims, 6 Drawing Sheets

COMPUTERIZED ELECTRONIC DEVICE WITH BILL VALIDATING MODULE

FIELD OF THE INVENTION

The present invention generally relates to computerized electronic devices, and in particular to a computerized electronic device incorporating a bill validating module therein.

DESCRIPTION OF RELATED ART

The U.S. Secret Service estimates that about 1 billion dollars worth of counterfeit U.S. currency is printed every year. Ninety percent of that is confiscated by authorities before distribution, but that leaves hundreds of millions in counterfeit currency floating around the world. People worry about getting stuck with funny money, and some buy devices that can help them determine whether a bill is counterfeit. The most common type of detector uses ultraviolet light.

However, typical devices used to detect counterfeit currency are not very sophisticated and still require the user to possess special knowledge to determine whether a bill is counterfeit.

For better protection against counterfeit currency, what is desired is a device for bill validating which overcomes the above-mentioned problems.

SUMMARY OF THE INVENTION

An exemplary computerized electronic device includes a base, a display pivotably attached to the base, a sending module fixed to the display for emitting a light beam, a receiving module fixed to the base for receiving the light beam emitted by the sending module and passing through an article to be detected, and a controller for receiving signals from the receiving module and processing the signals to obtain a result therefrom.

Another exemplary computerized electronic device includes a base, a display pivotably attached to the base, a sending module fixed to one of the base and the display, the sending module emitting a light beam for bill validating, a receiving module fixed to the other of the base and the display, the receiving module receiving the light beam emitted by the sending module, and a processor receiving and analyzing signals from the receiving module to obtain a result.

Other systems, methods, features, and advantages of the present computerized electronic device will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present computerized electronic device can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe the embodiments of the present computerized electronic device, in detail.

Most paper currency has unique security features such as: security thread, portrait, serial number, watermark, color-shifting ink, microprinting, etc. The watermark is a translucent design embedded in a bill, which can be seen when held up to a light. Numbers printed in color-shifting ink appear to change color when viewed from different angles. These features help people to recognize authenticity of a bill with unaided eyes to a certain extent.

However, some other features of paper currency cannot be so easily discerned. Security thread is a polymer thread woven in to a bill, having words printed on it that glow red under ultraviolet light. Typically, paper currency is made of high-density cotton and linen rag paper, with an ability to absorb infrared light. Additionally, tiny red and blue fibers embedded in the currency can be seen by use of a microscope or hand lens. At this time, every major currency in the world, except for French francs and West German marks printed before 1973, has magnetic particles embedded on its face. The particles, which enable counting machines to process stacks of money, are present in the printing ink and lie on certain predetermined spots on individual bills. Thus, the ink on the bills provides a magnetic signature, so the bills will be drawn toward an especially strong magnet (such as a neodymium magnet). For proper recognition of these features, special instruments are required.

Hereinafter, a portable computer is set as an example of a computerized electronic device to explain the idea of the present invention.

Figure 1:
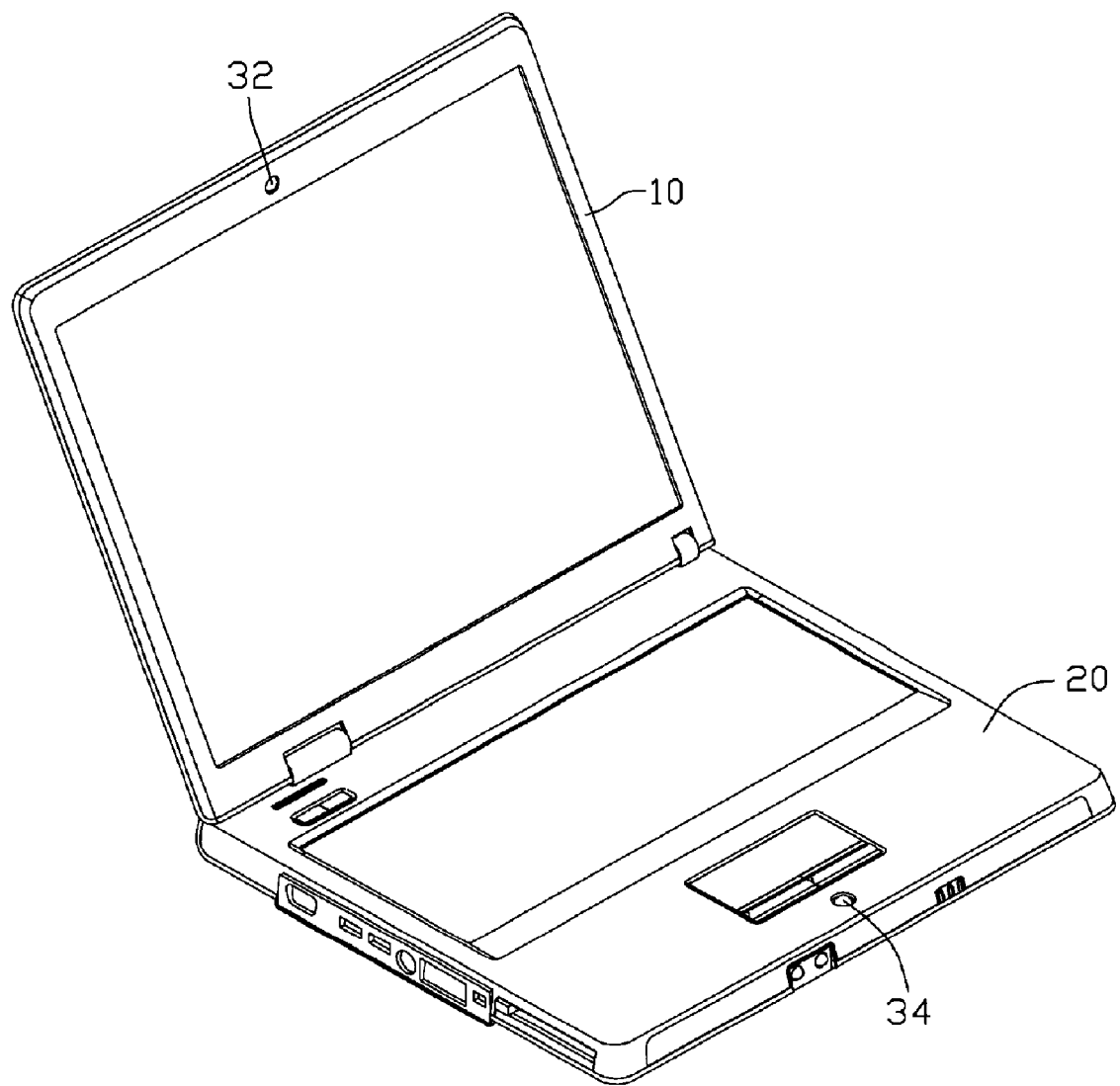
FIG. 1 is an isometric view of a portable computer in accordance with a first embodiment.

Referring to FIG. 1, a portable computer in accordance with a first embodiment includes a display 10 for showing and displaying text and pictures thereon and a base 20 for receiving a host system therein. The display 10 is pivotably hinged to the base 20.

Figure 2:
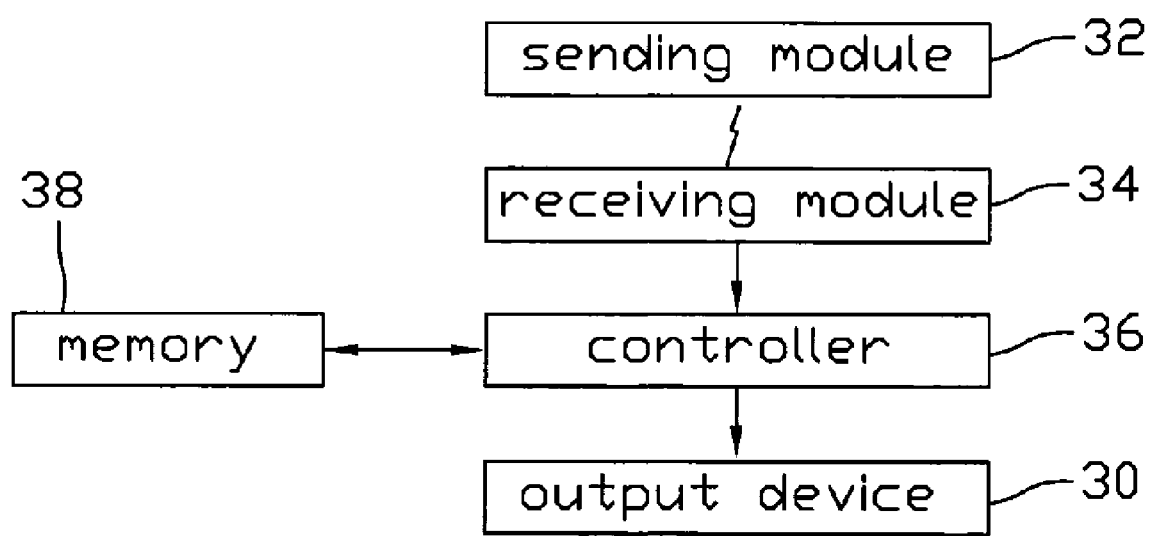
FIG. 2 is a block diagram showing architecture of the portable computer of FIG. 1.

Referring to FIG. 1 and FIG. 2 together, the portable computer is provided with a bill validating function. The portable computer incorporates a sending module 32, a receiving module 34, a controller 36, a memory 38, and an output device 30. The receiving module 34 receives signals from the sending module 32. The signals are successively transmitted to the controller 36. The memory 38 stores data on desired characteristics of currency, and is accessible by the controller 36. The output device 30 indicates a result obtained by the controller 36 and transmitted thereto.

The sending module 32 is fixed to the display 10, while the receiving module 34 is fixed to the base 20. The sending module 32 and the receiving module 34 are arranged to be generally aligned with each other, when the display 10 is closed to cover the base 20. The sending module 32 is a light emitter, for example an infrared light emitter, which is used to emit an infrared light beam with a wavelength of 850 to 980 nanometers. The receiving module 34 is a light sensor for receiving the light beam emitted by the sending module 32. The controller 36, the memory 38, and the output device 30 are secured in the base 20. The controller 36 may be a micro processor unit (MPU) or a controlling part of a micro controller unit (MCU) which constructs an MCU together with the memory 38. The memory 38 may be an independent memory, which is independent from the host system and is provided with a private power supply, or an available memory of the host system of the portable computer. The output device 30 is an alarm device, such as a buzzer and a flash lamp, for alerting a user, that currency has been presented that does not match the desired characteristics stored in the memory 38.

Currency made of cotton and linen rag paper absorb infrared light. When testing characteristics of a bill, the bill to be tested is placed on the base 20 over the receiving module 34. Then, the display 10 is pivoted towards a closed position so that infrared light from the sending module 32 strikes and then passes through the bill to the receiving module 34. As the emitted infrared light beam is partially absorbed by the bill, the received infrared light, which penetrates through the bill, is weaker than the emitted infrared light. The receiving module 34 transmits a signal indicating an intensity of the received infrared light to the controller 36. The controller 36 receives and compares the signal with a desired signal stored in the memory 38. A result of the comparison made by the controller 36 is then transmitted to the output device 30, and the output device 30 outputs an audio and/or visual result based on the result.

Figure 3:
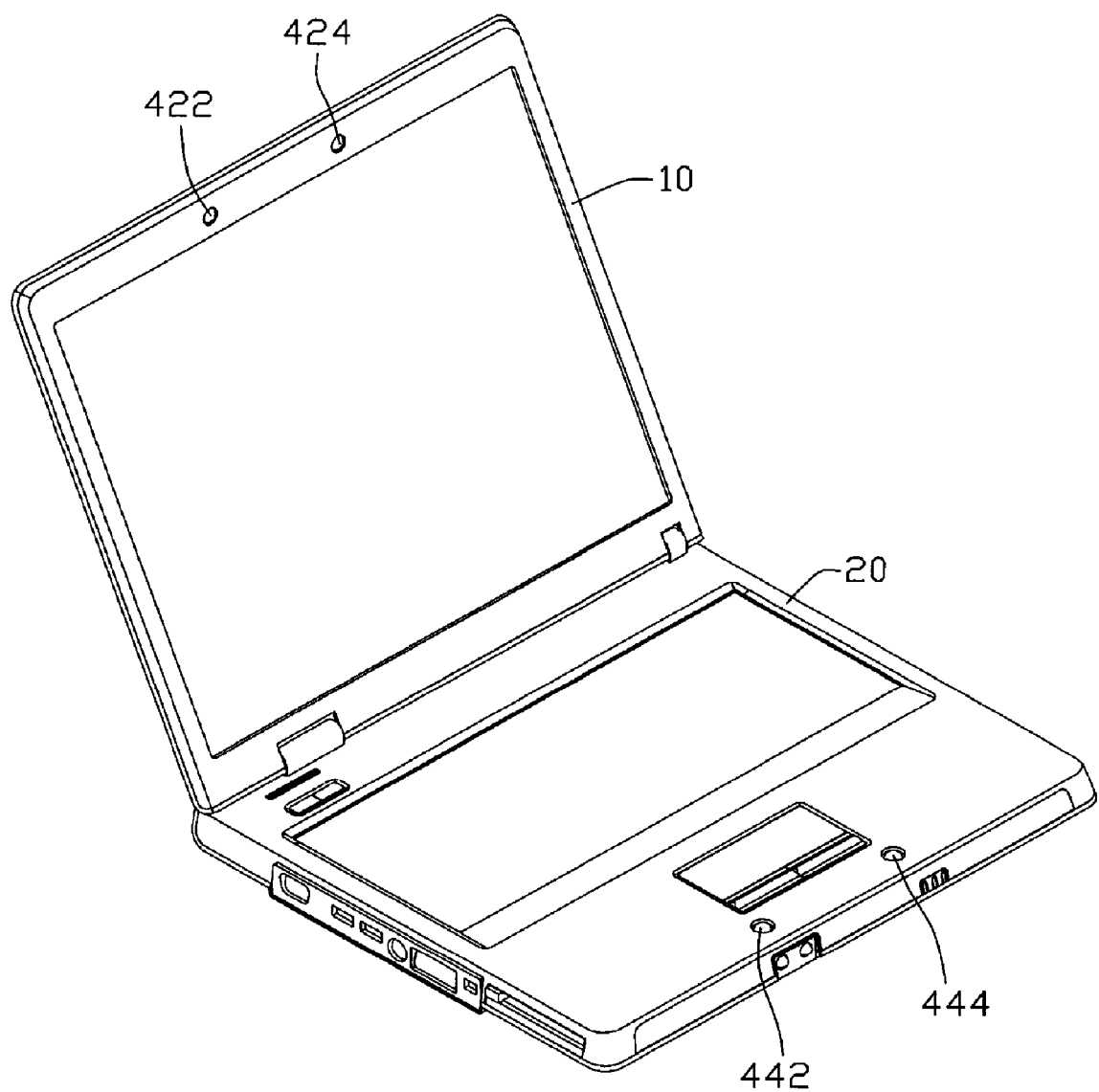
FIG. 3 is an isometric view of a portable computer in accordance with a second embodiment.
Figure 4:
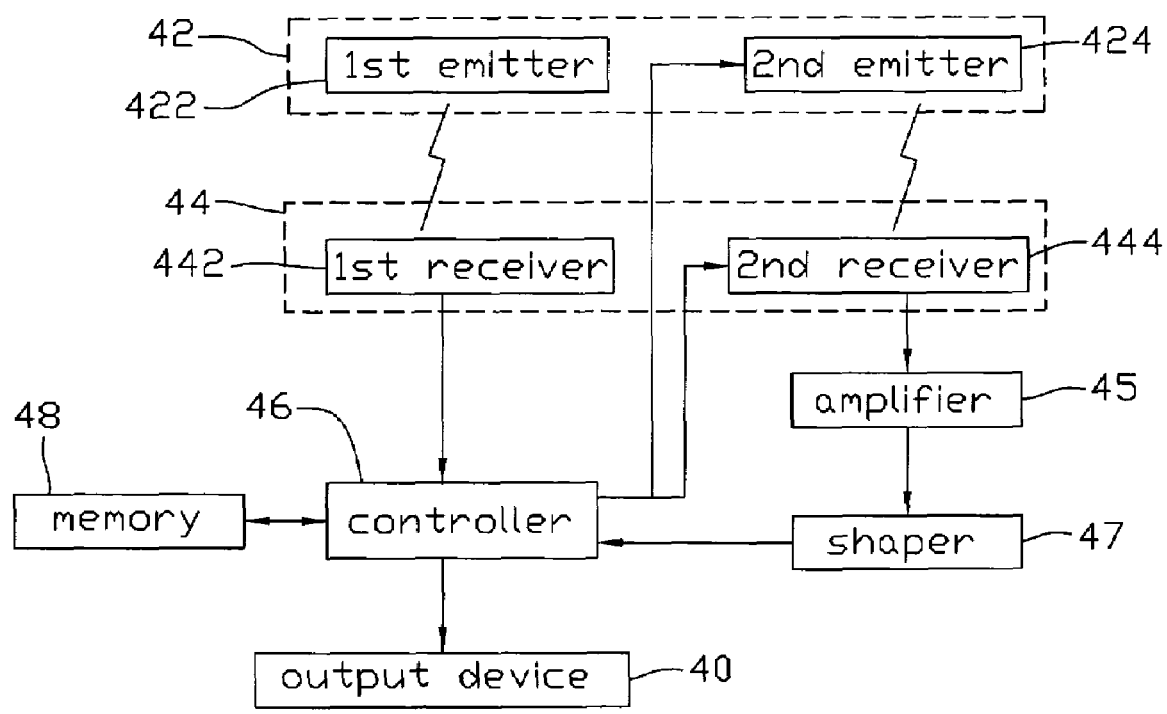
FIG. 4 is a block diagram showing architecture of the portable computer of FIG. 3.

Referring also to FIG. 3, a portable computer in accordance with a second embodiment, similar to the first embodiment, includes the display 10 and the base 20 of the first embodiment. Also referring to FIG. 4, the portable computer incorporates a sending module 42, a receiving module 44, a controller 46, a memory 48, and an output device 40. The sending module 42 is fixed to the display 10, while the receiving module 44 is fixed to the base 20. The sending module 42 and the receiving module 44 face each other in a closed state of the portable computer. The receiving module 44 receives signals from the sending module 42. The signals are successively transmitted to the controller 46. The memory 48, storing desired characteristics of a bill is accessible by the controller 46. The output device 40 indicates a result obtained by the controller 46 and transmitted thereto.

The sending module 42 includes a first emitter 422 and a second emitter 424. The receiving module 44 includes a first receiver 442 and a second receiver 444 respectively corresponding to the first emitter 422 and the second emitter 424. The first emitter 422 and the first receiver 442 cooperate to construct a first optical sensing system used as a switch for the second emitter 424 and the second receiver 444. The second emitter 424 and the second receiver 444 cooperate to construct a second optical sensing system used as a bill validating system.

The first optical sensing system may be a combination of an infrared light/visible light emitting diode and a photosensitive transistor. When the emitted light from the first emitter 422 to the first receiver 442 is obstructed by a bill, a signal transmitted from the first receiver 442 to the controller 46 is greatly weakened. Meanwhile, the controller 46 activates the second emitter 424 and the second receiver 444.

The second optical sensing system of the second emitter 424 and the second receiver 444 can be an infrared light penetrability detecting system. As a color and a thickness of ink printed on the bill affect the infrared light penetrability, mathematical manipulation and comparison analysis is done to achieve an accurate result. An amplifier 45 and a shaper 47 are sequentially provided to deal with an output signal of the second receiver 444. The output signal is subsequently transmitted to the controller 46 to be compared with a desired signal stored in the memory 48, after being amplified by the amplifier 45 and shaped by the shaper 47. A comparison result of the controller 46 is transmitted to the output device 40, for an indication of the result.

When the bill is removed, the emitted light of the first emitter 422 is transmitted to the first receiver 442 without being obstructed. A signal transmitted from the first receiver 442 to the controller 46 is strengthened, and the controller 46 shuts off the second emitter 424.

Figure 5:
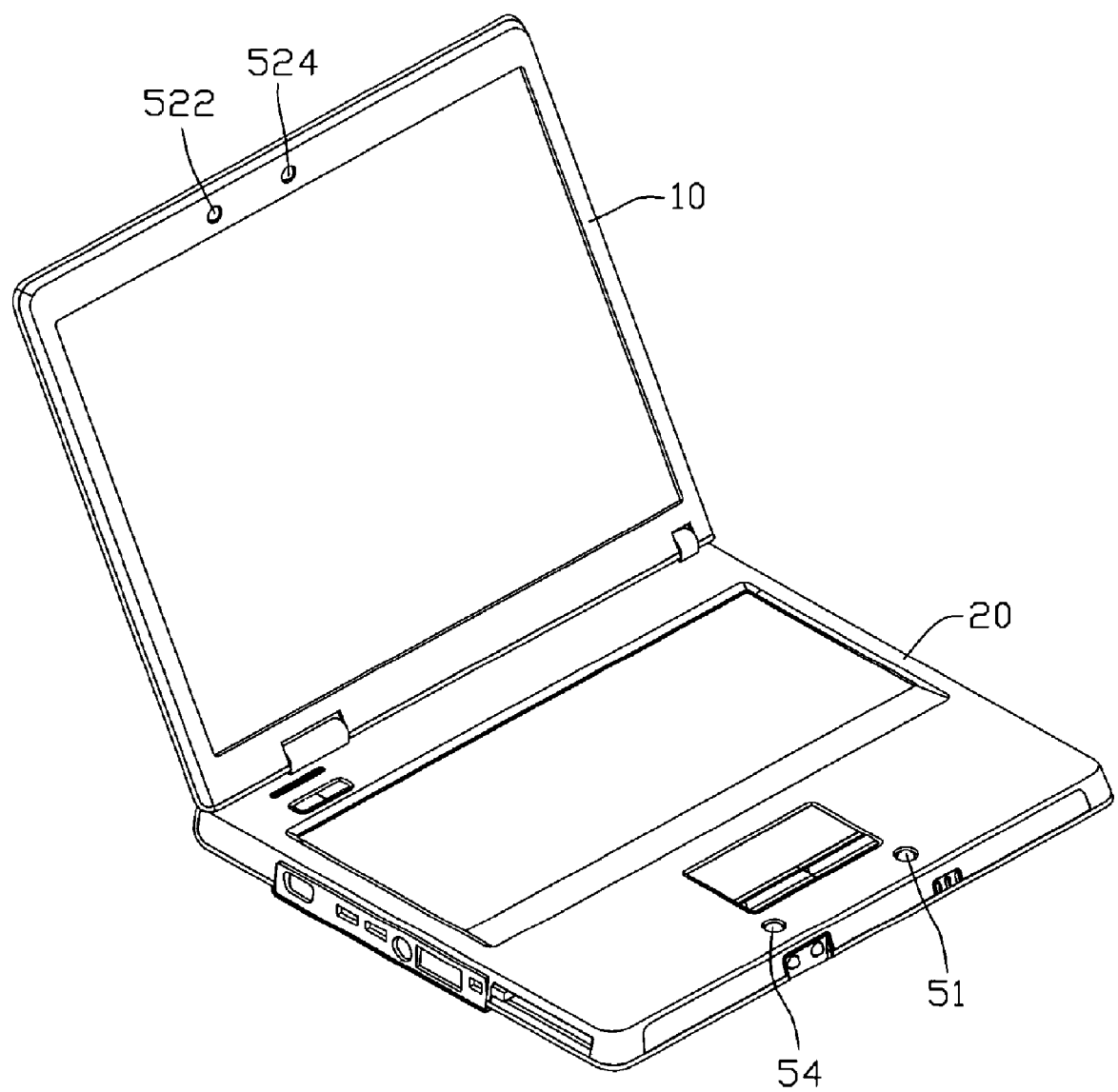
FIG. 5 is an isometric view of a portable computer in accordance with a third embodiment.
Figure 6:
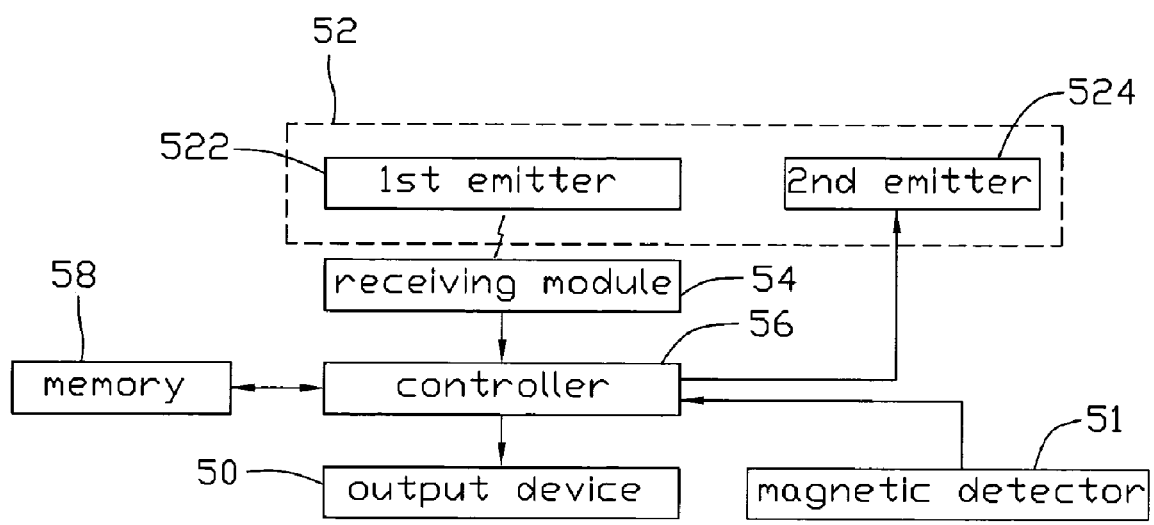
FIG. 6 is a block diagram showing architecture of the portable computer of FIG. 5.

Referring also to FIG. 5, a portable computer in accordance with a third embodiment, similar to the first embodiment, includes the display 10 pivotably attached to the base 20 of the first embodiment. Also referring to FIG. 6, the portable computer incorporates therein a sending module 52, a receiving module 54, a controller 56, a memory 58, a magnetic detector 51, and an output device 50. The sending module 52 is fixed to the display 10, while the receiving module 54 is fixed to the base 20. The receiving module 54 receives signals from the sending module 52. The received signals are successively transmitted to the controller 56. The memory 48, storing desired characteristics of a bill, is accessible by the controller 56. The output device 50 shows a result obtained by the controller 56 and transmitted thereto.

The first sending module 52 includes a first emitter 522 and a second emitter 524. The first emitter 522 and the receiving module 54 face each other in a closed state of the portable computer. The first emitter 522 and the receiving module 54 may be similar to the sending module 32 and the receiving module 34 in the first embodiment, or the first emitter 422 and the first receiver 442 in the second embodiment. That is, the first emitter 522 and the receiving module 54 may be an infrared light emitting system for infrared light penetrability detection, or an optical sensing system used as a switch for the second emitter 524. The second emitter 524 can be an ultraviolet light emitter for emitting an ultraviolet light beam with a wavelength of 420 to 460 nanometers, which allows visual inspection of the bill according to known parameters. The second emitter 524 emits an ultraviolet light beam towards a bill to determine that whether the bill to be detected is counterfeit. The magnetism of the bill can be detected by the magnetic detector 51. The bill can be drawn towards the magnetic detector 51 for further check due to the ink containing a magnetic signature.

The above-mentioned embodiments are merely exemplary examples. Each and every and possible combination of the above-mentioned bill validating method, such as the infrared light penetrability detecting method, the ultraviolet light detecting method, and the magnetic detecting method, is an embodiment according to the present invention.

The portable computers according to the embodiments adopts computer-aided devices to implement bill validation. This greatly improves the accuracy and smartness of the bill validation.

The above-mentioned bill validation module can also be applied to any documents and the like with similar security features as described above, such as bank notes, checks, invoices, licenses, certificates, etc. Additionally, the computerized electronic device can be, but not limited to a cash register, or a smart phone.

It should be emphasized that the above-described embodiments of the present invention, including any preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention.

All such modifications and variations are intended to be included herein within the scope of this disclosure and the present invention and be protected by the following claims.

What is claimed is:

1. A portable computer comprising:
a base receiving a host system therein;
a display pivotably attached to the base;
a sending module fixed to the display for emitting a light beam;
a receiving module fixed to the base for receiving a portion of the light beam emitted by the sending module and passing through a paper currency which is received in a gap between the display and the receiving module when the display pivots towards a closed position and the sending module and the receiving module face each other in the closed position of the portable computer, the receiving module then outputs a signal indicating an intensity of the received light beam;
a memory storing desired characteristics of the paper currency; and
a controller for receiving the signal from the receiving module and comparing the signal with the desired characteristics of the paper currency to obtain a result.

2. The portable computer as claimed in claim 1, wherein the sending module is an infrared light emitter, and the receiving module is an infrared light receiver, when the light beam from the sending module to the receiving module is partially obstructed by the paper currency, the signal transmitted from the receiving module to the controller is weakened.

3. The portable computer as claimed in claim 1, wherein the sending module comprises a first emitter and a second emitter, and the first emitter cooperates with the receiving module to form a switch for controlling whether the second emitter is activated.

4. The portable computer as claimed in claim 3, wherein the second emitter cooperates with the receiving module to form a validating module for validating whether the paper currency satisfies predetermined requirements.

5. The portable computer as claimed in claim 3, wherein the first emitter is an infrared light emitter, and the second emitter is an ultraviolet emitter.

6. The portable computer as claimed in claim 1, further comprising a magnetic detector fixed on the base for detecting magnetic ink of the paper currency upon a condition there is movement of the paper currency.

7. The portable computer as claimed in claim 1, wherein the light beam is selected from one or a combination of the group consisting of an infrared light beam, an ultraviolet light beam, and a visible light beam for currency validating.

8. The portable computer as claimed in claim 1, wherein the sending module is a light emitting diode, and the receiving module is photosensitive transistor.

9. The portable computer as claimed in claim 8, further comprising an output device to output the result of the controller, the output device being an acoustical or visual indicating device.

10. The portable computer as claimed in claim 9, wherein the output device is a buzzer or a flash lamp.

11. The portable computer as claimed in claim 9, further comprising an amplifier and a shaper connected in series between the receiving module and the controller, to amplify and shape the signal from the receiving module respectively, and send the amplified and shaped signal to the controller.

* * * * *